United States Patent
Gwon et al.

(10) Patent No.: US 12,542,487 B2
(45) Date of Patent: Feb. 3, 2026

(54) POWER MANAGEMENT CHIP AND OPERATING METHOD FOR SUPPORTING MULTIMODE OPERATIONS

(71) Applicant: SAMSUNG ELECTRONICS CO., LTD., Suwon-si (KR)

(72) Inventors: Huidong Gwon, Suwon-si (KR); Taehwang Kong, Suwon-si (KR); Minjae Kim, Suwon-si (KR); Junhyeok Yang, Suwon-si (KR); Yunho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 18/188,157

(22) Filed: Mar. 22, 2023

(65) Prior Publication Data

US 2024/0072664 A1    Feb. 29, 2024

(30) Foreign Application Priority Data

Aug. 25, 2022   (KR) .................. 10-2022-0107092

(51) Int. Cl.
  *H02M 3/158*   (2006.01)
  *H02M 1/00*    (2006.01)
  *H02M 1/36*    (2007.01)

(52) U.S. Cl.
  CPC ......... *H02M 3/158* (2013.01); *H02M 1/0032* (2021.05); *H02M 1/0045* (2021.05); *H02M 1/36* (2013.01)

(58) Field of Classification Search
  CPC ...... H02M 3/158; H02M 3/156; H02M 3/157; H02M 1/0032; H02M 1/0045; H02M 1/36;

(Continued)

(56) References Cited

U.S. PATENT DOCUMENTS 7,064,531 B1 * 6/2006 Zinn ..................... H02M 3/158
                                                                  323/283
9,088,210 B2    7/2015 Oddoart et al.
(Continued)

FOREIGN PATENT DOCUMENTS

| JP | 4352319 | 10/2009 |
| KR | 10-2359128 | 2/2022 |
| WO | 20150105808 | 7/2015 |

OTHER PUBLICATIONS

European Extended Search Report dated Jan. 22, 2024 in corresponding EP 23170873.6.

*Primary Examiner* — Jue Zhang
*Assistant Examiner* — Jye-June Lee
(74) *Attorney, Agent, or Firm* — Morgan, Lewis & Bockius LLP

(57) ABSTRACT

A power management chip includes a gate driver configured to output a first gate signal driving a first power switch and a second gate signal driving the second power switch, a multiplexer configured to receive an error detect signal from a first error amplifier and a first gate signal from the gate driver, and drive the first power switch with either of the error detect signal or the first gate signal in response to a mode select signal; an inductor detection logic configured to receive the inductor detect signal, output a comparison detect signal and a pulse signal for detecting an external inductor, and output the mode select signal corresponding to a result of the detecting, and a comparator comparing an internal output voltage of an output node and an output voltage of the feedback node in response to the comparison detect signal.

21 Claims, 20 Drawing Sheets

(58) Field of Classification Search
CPC .... H02M 1/0048; H02M 1/08; H02M 1/0025; H02M 1/0058; G06F 1/30; H03K 17/6871
See application file for complete search history.

(56) References Cited

U.S. PATENT DOCUMENTS

| | | |
|---|---|---|
| 9,590,506 B2 | 3/2017 | Rince et al. |
| 10,505,441 B2 | 12/2019 | Hsieh |
| 2009/0309559 A1* | 12/2009 | Xia .................... H02M 3/1588 323/265 |
| 2010/0026250 A1 | 2/2010 | Petty |
| 2011/0022826 A1 | 1/2011 | More et al. |
| 2012/0161732 A1* | 6/2012 | Renton ................ H02M 3/156 323/275 |
| 2013/0229161 A1 | 9/2013 | Chen |
| 2014/0111169 A1* | 4/2014 | Polarouthu ........... H02M 3/156 323/271 |
| 2015/0069984 A1 | 3/2015 | Chen et al. |
| 2016/0172973 A1* | 6/2016 | Rince .................... H02M 3/158 323/271 |
| 2016/0190926 A1 | 6/2016 | Ni et al. |
| 2017/0147020 A1* | 5/2017 | Turkewadikar ..... H02M 1/0045 |
| 2017/0160756 A1* | 6/2017 | Hsieh .................... H02M 3/158 |
| 2020/0321865 A1* | 10/2020 | Bogue .................. H02M 3/158 |
| 2022/0129024 A1 | 4/2022 | Turkewadikar et al. |

* cited by examiner

POWER MANAGEMENT CHIP AND OPERATING METHOD FOR SUPPORTING MULTIMODE OPERATIONS

CROSS-REFERENCE TO RELATED APPLICATION(S)

This U.S. non-provisional patent application claims priority under 35 USC 119(a) to Korean Patent Application No. 10-2022-0107092 filed on Aug. 25, 2022 in the Korean Intellectual Property Office, the disclosure of which is incorporated by reference in its entirety herein.

TECHNICAL FIELD

The present inventive concept relates to a power management chip, an electronic device having the same, and a method of operating the same.

DISCUSSION OF RELATED ART

A power management chip may be used to supply an operating voltage to devices such as a Mobile device, a high-performance-computing (HPC) device, or an Internet-of-things (IoT) device. A buck type power management chip includes an inductor and a low-dropout regulator (LDO) power management chip omits the inductor. For example, the buck type power management chip may be used to supply the operating voltage to a device without an inductor and the LDO power management chip may be used to supply the operating voltage to a device that includes the inductor.

SUMMARY

At least one embodiment of the present inventive concept provides a power management chip supporting multimode operations, an electronic device having the same, and a method of operating the same.

At least one embodiment of the present inventive concept provides a power management chip reducing leakage current in an LDO mode, an electronic device having the same, and a method of operating the same.

At least one embodiment of the present inventive concept provides a power management chip reducing overshoot in a buck mode, an electronic device having the same, and a method of operating the same.

According to the present inventive concept, a power management chip includes a first power switch connected between a power terminal and an output node; a second power switch connected between the output node and a ground terminal; a first error amplifier configured to compare a feedback node and a reference voltage in response when a mode select signal is a first logic level; a second error amplifier configured to compare a feedback node and a reference voltage when the mode select signal is a second other logic level; a pulse width modulation logic configured to receive an output of the second error amplifier and output a drive signal; a gate driver configured to receive an inductor detect signal and the mode select signal, receive the drive signal from the pulse width modulation logic, and output a first gate signal driving the first power switch and a second gate signal driving the second power switch; a multiplexer configured to receive an error detect signal from the first error amplifier and a first gate signal from the gate driver, and drive the first power switch with one of the error detect signal and the first gate signal in response to the mode select signal; an inductor detection logic configured to receive the inductor detect signal, output a comparison detect signal and a pulse signal for determining whether an external inductor is present, and output the mode select signal corresponding to a result of the determining; and a comparator comparing an internal output voltage of the output node and an output voltage of the feedback node in response to the comparison detect signal.

According to the present inventive concept, a method of operating a power management chip for supporting multimode operations, includes detecting a presence of an external inductor; and selecting one of a low drop out (LDO) mode and a buck mode based on a result of the detecting, wherein the detecting the presence of an inductor includes shorting a flow switch between an output node and a feedback node in response to a pulse signal; and comparing an internal output voltage of the output node and an output voltage of the feedback node.

According to the present inventive concept, a method of operating a power management chip for determining one of a low drop out (LDO) mode and a buck mode, depending on whether an inductor is detected, includes starting up the buck mode using a sleep LDO; and reducing overshoot of an output voltage by shorting an inductor both end switch, when transitioning from an active mode to a power-down mode.

According to the present inventive concept, an electronic device includes an application configured to control an operation; a memory device configured to store data for the operation of the application; and a power management chip configured to supply power to the application and the memory device, wherein the power management chip operates in one of a low drop out (LDO) mode or a buck mode depending on a presence or absence of an external inductor, and the power management chip starts up in the buck mode using a sleep LDO.

BRIEF DESCRIPTION OF DRAWINGS

The above and other aspects and features of the present inventive concept will be more clearly understood from the following detailed description, taken in conjunction with the accompanying drawings, in which.

DETAILED DESCRIPTION

Hereinafter, the present inventive concept will be described clearly and in detail using the drawings to the extent that those of ordinary skill in the art may implement the same.

In an embodiment, a power management chip for supporting a low drop out (LDO) type power management chip and a buck type power management chip share a power switch for area efficiency. The power switch may include an analog multiplexer (MUX) for selecting one of an LDO mode or a buck mode. When the LDO mode is operated, accuracy of an output voltage may deteriorate due to leakage current of the analog MUX. In addition, the power management chip should increase an output stably during start-up for stable operation of a product during start-up. The buck type power management chip may cause an overcurrent or overvoltage at an output during start-up. Therefore, the buck type power management chip needs a soft-start-up that stably increases its output to a desired voltage in a start-up situation. Also, when the power management chip operates in the buck mode, the operation mode may be changed from an active mode in which a load current is high to a power-down mode in which a load current is low. In this case, an overshoot may occur in which an output voltage of the power management chip rises due to a charging current of an inductor. In this case, for stable operation of load, excessive overshoot of the output voltage of the power management chip of the load should be prevented.

A power management chip according to an embodiment operates in one of an LDO mode or a buck mode according to an output of an inductor sensing circuit. To reduce a leakage current generated when sharing a power switch, this dual-mode power management chip may perform a stable soft-start-up suitable for an analog MUX and a buck mode operation. For example, a power management chip of an embodiment may perform stable start-up in the buck mode using a sleep LDO. In addition, a power management chip of an embodiment may prevent overshoot of an output voltage, which may occur when the buck mode is changed from the active mode to the power-down mode while driving the buck mode.

Figure 1:
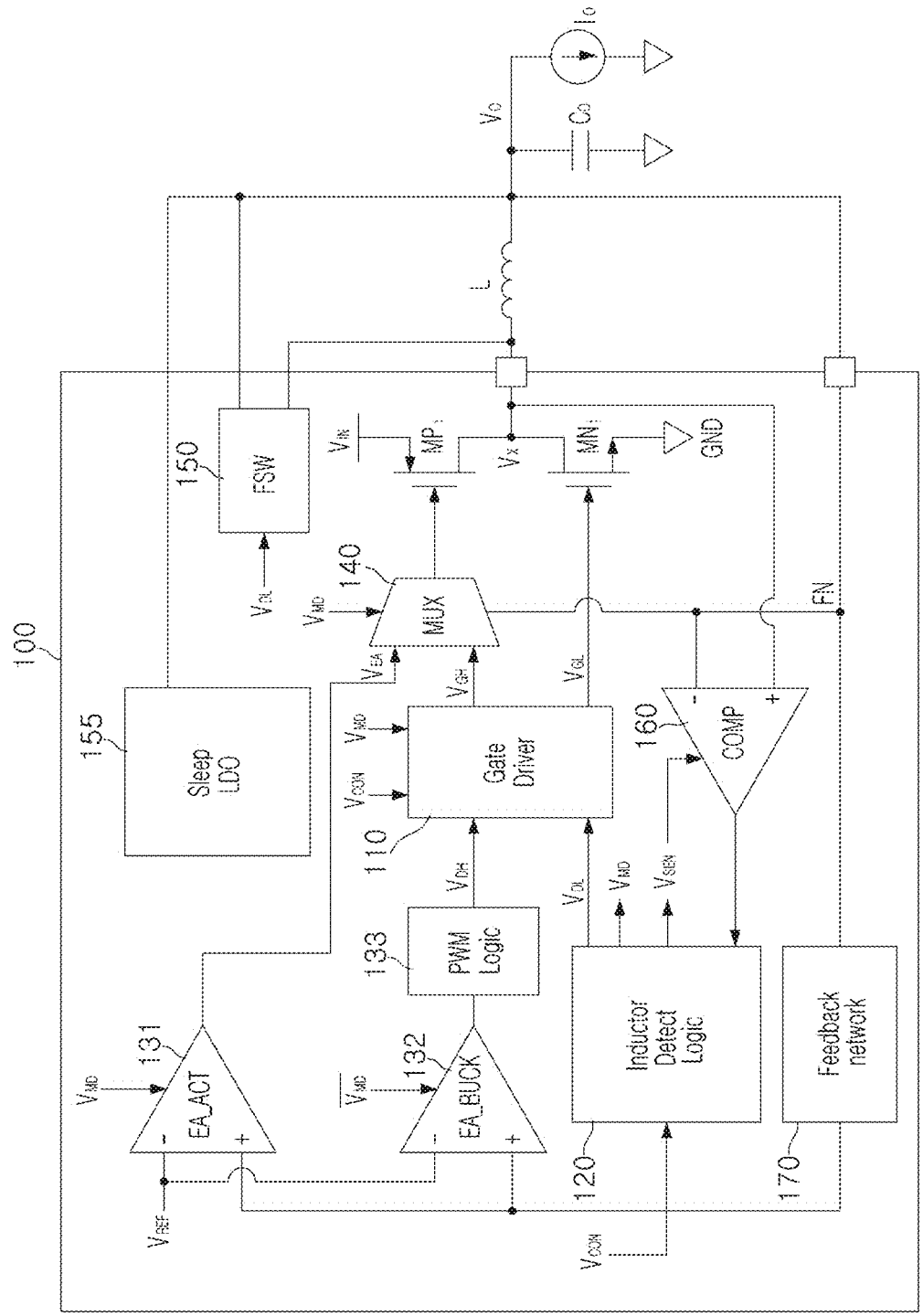
FIG. 1 is a view illustrating a power management chip according to an embodiment.

FIG. 1 is a view illustrating a power management chip according to an embodiment. Referring to FIG. 1, a power management chip 100 includes a first power switch $MP_1$, a second power switch $MN_1$, a gate driver 110 (e.g., a driver circuit), an inductor detection logic 120 (e.g., a logic circuit), a first error amplifier 131, a second error amplifier 132, a pulse width modulation (PWM) logic 133 (e.g., a logic circuit), a multiplexer 140, a flow switch (FSW) 150, a sleep LDO 155, a comparator 160, and a feedback network circuit 170.

The first power switch $MP_1$ may be connected between a power terminal $V_{IN}$ and an internal output voltage $V_X$. In an embodiment, the first power switch $MP_1$ may include a P-channel metal oxide semiconductor (PMOS) transistor. The first power switch $MP_1$ may be turned on in response to an output signal of the multiplexer 140.

The second power switch $MN_1$ may be connected between the internal output voltage $V_X$ and a ground terminal GND. In an embodiment, the second power switch $MN_1$ may include an N-channel metal oxide semiconductor (NMOS) transistor. The second power switch $MN_1$ may be turned on in response to a second gate signal $V_{GL}$ output by the gate driver 110.

The gate driver 110 may be implemented to receive a drive signal $V_{DH}$, an inductor detect signal $V_{CON}$, and a mode select signal $V_{MD}$, and to output a first gate signal $V_{GH}$ and a second gate signal $V_{GL}$.

The inductor detection logic 120 may be implemented to receive the inductor detect signal $V_{CON}$, and to output the mode select signal $V_{MD}$ corresponding to a presence or an absence of an inductor.

The first error amplifier 131 (EA_ACT) may be implemented to compare a reference voltage $V_{REF}$ and a feedback voltage, and to output a first error voltage $V_{EA}$. The first error amplifier 131 may be activated in response to the mode select signal $V_{MD}$.

The second error amplifier 132 (EA_BUCK) may be implemented to compare the reference voltage VREF and the feedback voltage, and to output an error voltage. The second error amplifier 132 may be activated in response to an inverted mode select signal $/V_{MD}$. For example, the second error amplifier 132 may be activated when the first error amplifier 131 is deactivated, and the second error amplifier 132 may be deactivated when the first error amplifier 131 is activated.

The PWM logic 133 may receive a second error voltage output by the second error amplifier 132, and may output the drive signal $V_{DH}$ for use in driving the power switches $MP_1$ and $MN_1$.

The multiplexer 140 may be implemented to output either of the first error voltage $V_{EA}$ or the first gate signal $V_{GH}$ in response to the mode select signal $V_{MD}$. In this case, the mode select signal $V_{MD}$ may be a voltage indicating a presence or an absence of an inductor L. For example, the multiplexer 140 may select either an LDO mode or a buck mode according to the presence or absence of the inductor.

The FSW 150 may be connected between an output node and a feedback node FN, may receive a pulse signal $V_{DL}$ for detecting the inductor L, and may open/disconnect depending on the presence or absence of the inductor L. For example, the pulse signal $V_{DL}$ may include one or more pulses.

The sleep LDO 155 may be connected to the feedback node FN, and may be implemented to output a stable voltage. The sleep LDO 155 may be used for soft-start-up when driving in the buck mode. In this case, the sleep LDO 155 may be implemented as an LDO dedicated to a sleep mode.

The comparator 160 may be implemented to compare a voltage of the internal output voltage $V_X$ and a PMIP output voltage of the feedback node FN, to output a comparison result signal $V_{COMP}$. The comparator 160 may be activated in response to a comparison detect signal $V_{SEN}$. The comparison detect signal $V_{SEN}$ may be output by the inductor detection logic 120.

The feedback network circuit 170 may be implemented to output a voltage of the feedback node FN. A PMIP output voltage $V_O$ and an output current $I_O$ may be output from the feedback node FN. An output capacitor $C_O$ may be connected to the feedback node FN. The output capacitor $C_O$ may be connected between the feedback node FN and a ground terminal or voltage.

A power management chip 100 according to an embodiment may include an analog multiplexer 140 that selects an LDO mode operation or a buck mode operation depending on the presence or absence of the inductor L externally on a chip, and may share the feedback network circuit 170, the reference voltage $V_{REF}$, and the first power switch $MP_1$ in both the LDO mode and the buck mode. In an embodiment, the multiplexer 140 is connected to the output voltages $V_O$ (PMIP output) to reduce leakage current generated during the LDO mode operation. In an embodiment, the inductor detection logic 120, the FSW 150, and the comparator 160 are used to detect the presence or absence of the inductor. In an embodiment, the sleep LDO 150 for soft-start-up is used when the buck mode is driven. In an embodiment, the power management chip 100 may support the buck mode operation by the buck mode error amplifier 132, the PWM logic 133 receiving an output of the error amplifier 132 to generate the power switch drive signal $V_{DH}$, and the gate driver 110, and may support the LDO mode operation by the LDO mode error amplifier 131.

Figure 2:
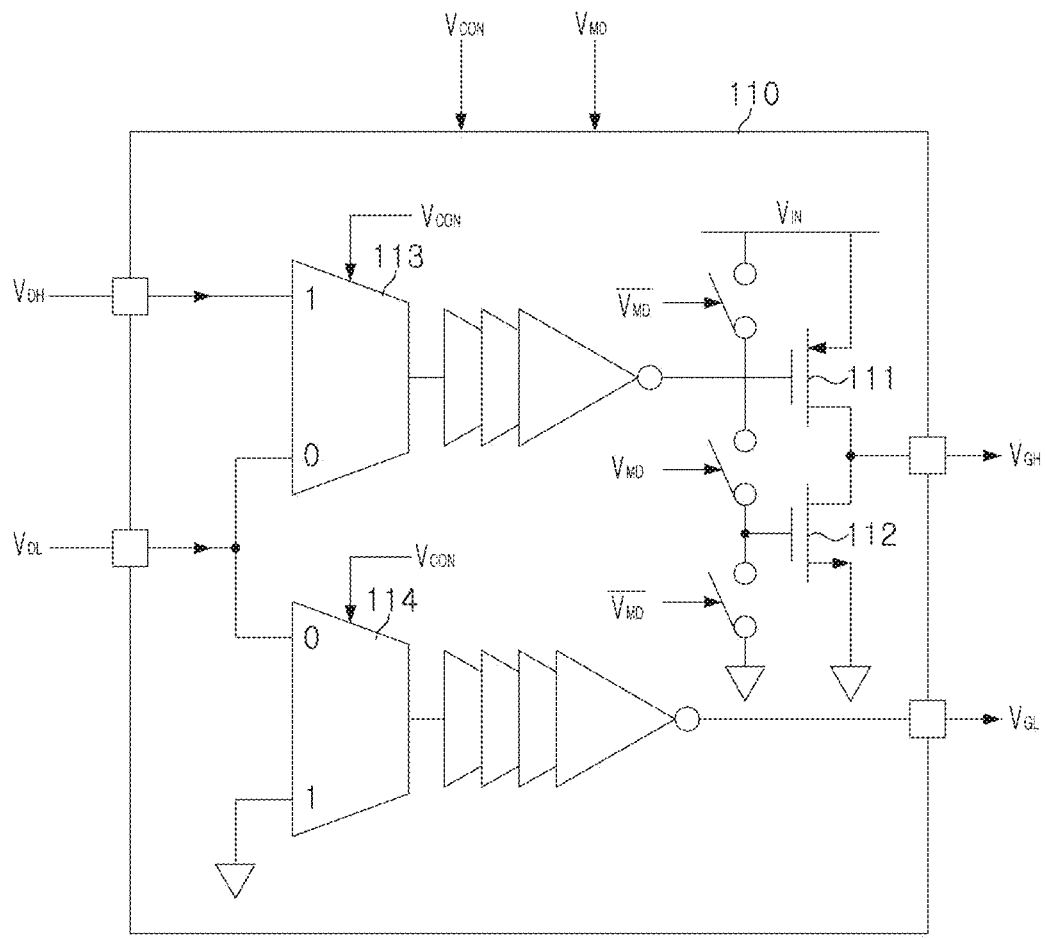
FIG. 2 is a view illustrating an embodiment of the gate driver 110 illustrated in FIG. 1.

FIG. 2 is a view illustrating an embodiment of the gate driver 110 illustrated in FIG. 1. Referring to FIG. 2, the gate driver 110 may include switches 111 and 112 and multiplexers 113 and 114.

The switches 111 and 112 may be implemented to float a final terminal output of the gate driver 110 according to the mode select signal $V_{MD}$.

Each of the multiplexers 113 and 114 may receive the input signals $V_{DH}$ and $V_{DL}$ for a presence/absence detection mode of the inductor.

The switch 111 may be implemented by a first transistor receiving a power voltage $V_{IN}$ and the switch 112 may be implemented by a second transistor between the first transistor and a ground terminal. The first gate signal $V_{GH}$ may be output from a node connected between the first and second switches 111 and 112. An additional first switch may be connected between a node providing the power voltage $V_{IN}$ and a first additional node, an additional second switch may be connected between the first additional node and a gate of the second transistor, and an additional third switch may be connected between the gate and a ground terminal. The inverted mode select signal $/V_{MD}$ may control opening and closing of the first and third additional switches and the mode select signal $V_{MD}$ may control opening and closing of the second additional switch. One or more delay circuits (e.g., inverters) may be present between an output of multiplexer 113 and a gate of the first transistor. One or more delay circuits (e.g., inverters) may be present between an output of multiplexer 114 and a gate of the second transistor.

In an embodiment, multiplexer 113 receives input signals $V_{DH}$ and $V_{DL}$ and multiplexer 113 receives input signal $V_{DL}$ and a ground voltage.

Figure 3:
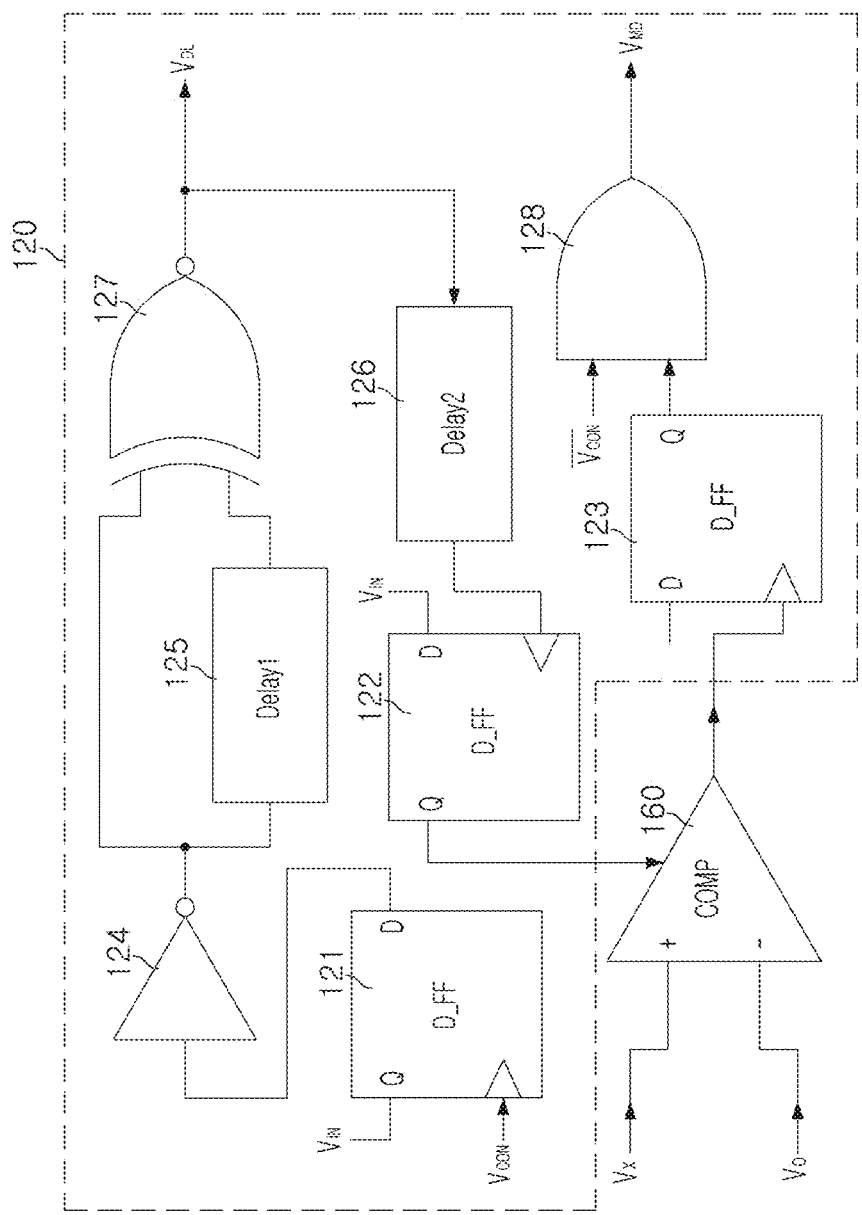
FIG. 3 is a view illustrating an inductor detection logic 120 and a comparator according to an embodiment.

FIG. 3 is a view illustrating an inductor detection logic 120 and a comparator according to an embodiment.

Referring to FIG. 3, an inductor detection logic 120 may include flip-flops 121, 122, and 123, an inverter 124, delay circuits 125 and 126, an XOR logic 127 (e.g., an XOR logic gate), and an AND logic 128 (e.g., an AND logic gate). The inductor detection logic 120 may receive an inductor detect signal $V_{CON}$ indicating an inductor presence mode or an absence detection mode and a comparison result signal $V_{COMP}$ of a comparator 160 externally. In addition, the inductor detection logic 120 may output a pulse signal $V_{DL}$ for detecting an inductor, a mode select signal $V_{MD}$ for selecting a PMIP driving mode depending on presence or absence of the inductor, and a comparison detect signal $V_{SEN}$ to the comparator 160. In this case, the output signal $V_{DL}$ may drive a gate driver 110 (refer to FIG. 1) and an FSW 150, which may be an inductor both end switch, in the inductor presence/absence detection mode.

The AND logic 128 may receive an inverted inductor detect signal $/V_{CON}$. A clock terminal of flip-flop 121 may receive the inductor detect signal $V_{CON}$. A clock terminal of flip-flop 122 may receive an output of the delay circuit 126.

It should be understood that the inductor detection logic 120 illustrated in FIG. 3 is merely illustrative, and may be implemented in various manners.

A power management chip 100 according to an embodiment may be used without any restrictions on presence or absence of an inductor externally on a chip by supporting a dual-mode PMIC capable of driving in a buck mode or an LDO mode according to a user's preference. When driving in the buck mode, the power management chip 100 enables soft-start-up by starting up using a sleep LDO without a separate complicated start-up circuit. When driving in the LDO mode, the power management chip 100 may increase accuracy of an output voltage due to leakage of a multiplexer, compared to an existing dual-mode PMIC. When driving in the buck mode, the power management chip 100 may reduce overshoot of the output voltage when transitioning from an active mode to a power-down mode.

A power management chip 100 according to an embodiment may include a loop constituting a buck mode and a loop constituting an LDO mode. The loop of the LDO mode may include an error amplifier 131 for the LDO mode that detects an error by receiving a feedback voltage of an output voltage, and a power switch MPi that receives an output of the error amplifier 131 and supplies a current to a load. The loop constituting the buck mode may include an error amplifier 132 for the buck mode that detects an error by receiving a feedback voltage of an output voltage, a PWM logic 133 that generates a PWM pulse by receiving an output of the error amplifier 132, and a gate driver 110 that receives the PWM pulse and drives power switches $MP_1$ and $MN_1$.

Two modes may share a power switch $MP_1$ and a feedback network 170 that generates a feedback voltage of an output voltage. An input signal of an analog MUX (a multiplexer 140) for selecting a mode may be determined according to an output of the inductor detection logic 120 for detecting the presence or absence of an inductor. In an embodiment, a mode is not changed during an operation depending on a load current level. In addition, the analog MUX of an embodiment may have a connection for reducing a leakage current. In addition, a power management chip of an embodiment may support a dual mode, and may start-up using a sleep mode dedicated LDO (a sleep LDO).

When transitioning from an active mode to a power-down mode through a switch across the inductor, overshoot of the output voltage may be reduced.

An operation of a power management chip 100 according to an embodiment may be divided into an LDO mode and a buck mode according to a mode select signal $V_{MD}$ of an inductor detection logic 120 according to presence or absence of an external inductor.

Figure 4:
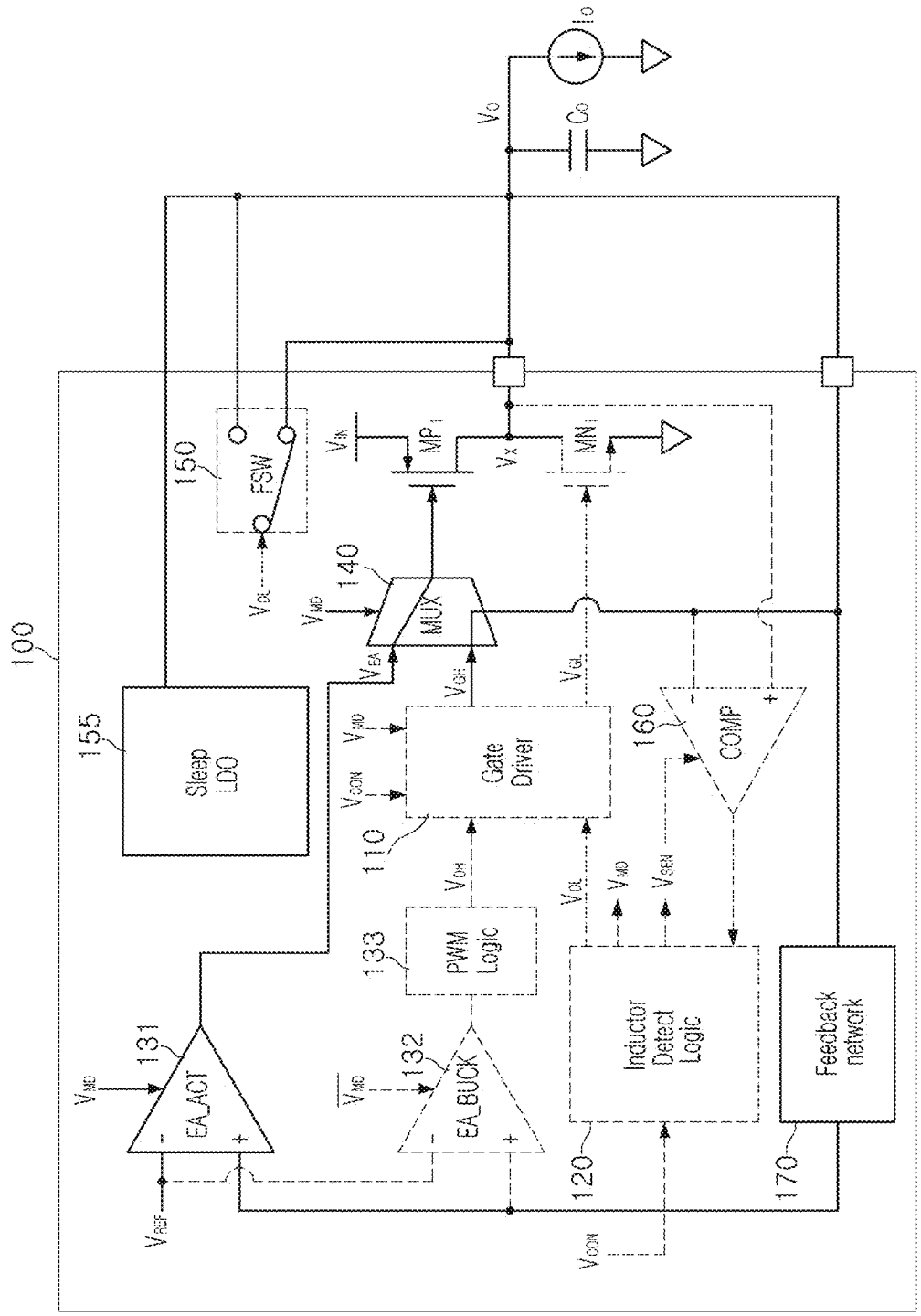
FIG. 4 is a view illustrating an LDO mode of a power management chip according to an embodiment.

FIG. 4 is a view illustrating an LDO mode of a power management chip according to an embodiment.

As illustrated in FIG. 4, there may be no inductor outside a power management chip 100. In this case, a mode select signal $V_{MD}$ of an inductor detection logic 120 may indicate a low level (e.g., a first logic level). The power management chip 100 may operate in an LDO mode according to the mode select signal $V_{MD}$ having the low level.

In this case, a multiplexer 140 may connect an LDO mode error amplifier EA_ACT 131 and a first power switch $MP_1$, to drive the first power switch $MP_1$ with an error voltage $V_{EA}$ of the error amplifier EA_ACT 131. In this case, a buck mode error amplifier EA_BUCK 132 and a PWM logic 133 may be turned off to reduce power consumption. A second gate signal $V_{GL}$ of a gate driver 110 may have a low level. The second gate signal $V_{GL}$ having the low level may turn off a second power switch $MN_1$. Also, a first gate signal $V_{GH}$ connected to the multiplexer 140 may be connected to an output $V_O$ of the power management chip 100.

Figure 5:
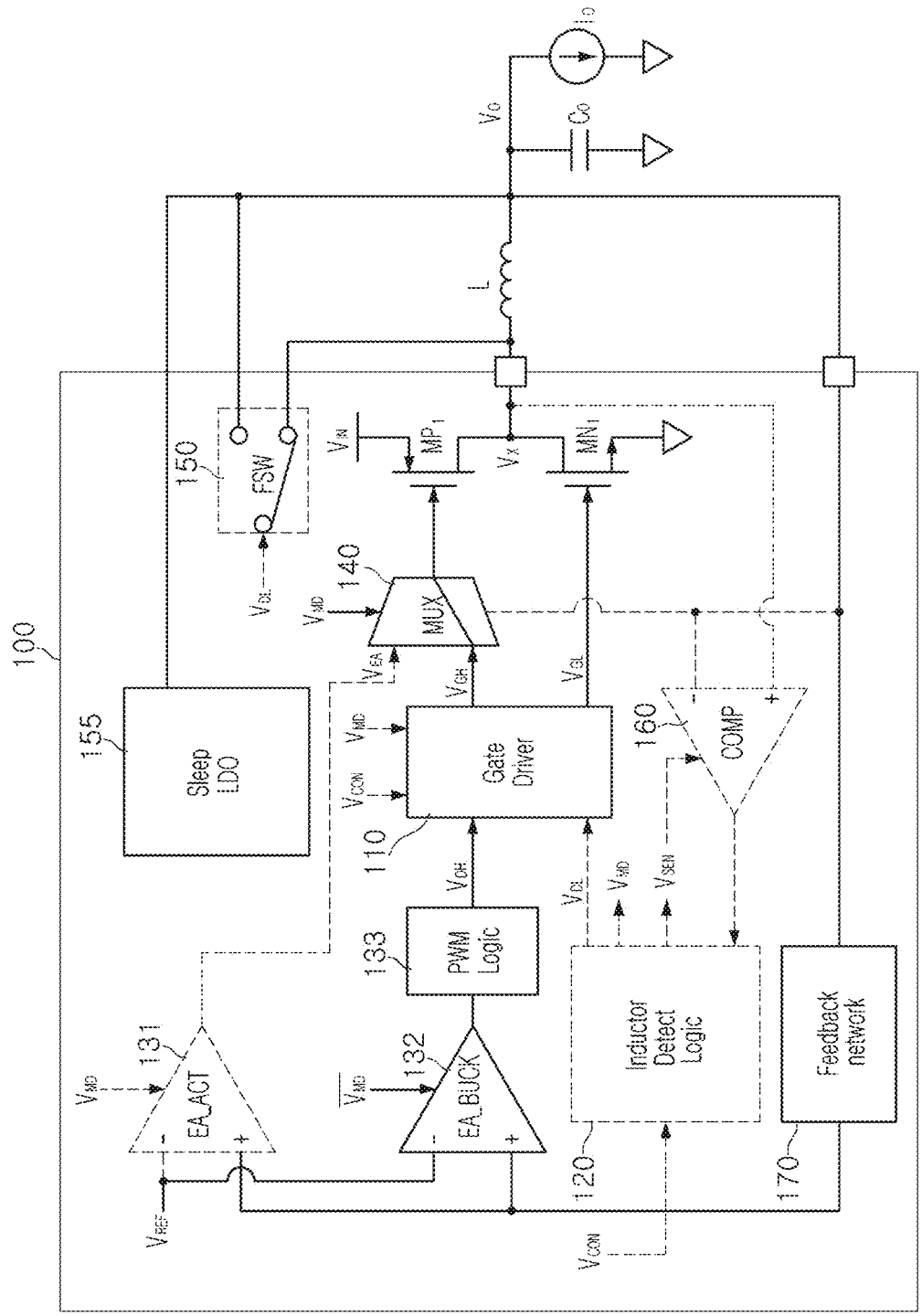
FIG. 5 is a view illustrating a buck mode of a power management chip according to an embodiment.

FIG. 5 is a view illustrating a buck mode of a power management chip according to an embodiment.

As illustrated in FIG. 5, when an inductor is present outside a power management chip 100, a mode select signal $V_{MD}$ may have a high level. In response to the mode select signal $V_{MD}$ having the high level (e.g., a second logic level different from the first logic level), the power management chip 100 may operate in a buck mode.

In this case, a multiplexer 140 may drive a power switch $MP_1$ by connecting an output signal $V_{GH}$ of a gate driver 110 and the power switch $MP_1$. In this case, a first error amplifier EA_ACT 131 may be turned off to reduce power consumption. The gate driver 110 may receive a drive signal $V_{DH}$ from a PWM logic 133, and may generate gate signals $V_{GH}$ and $V_{GL}$ for driving power switches $MP_1$ and $MN_1$.

When a power management chip 100 according to an embodiment is driven in the LDO mode, it may be possible to prevent deterioration in precision of output voltage due to a leakage current of the multiplexer 140.

Figure 6:
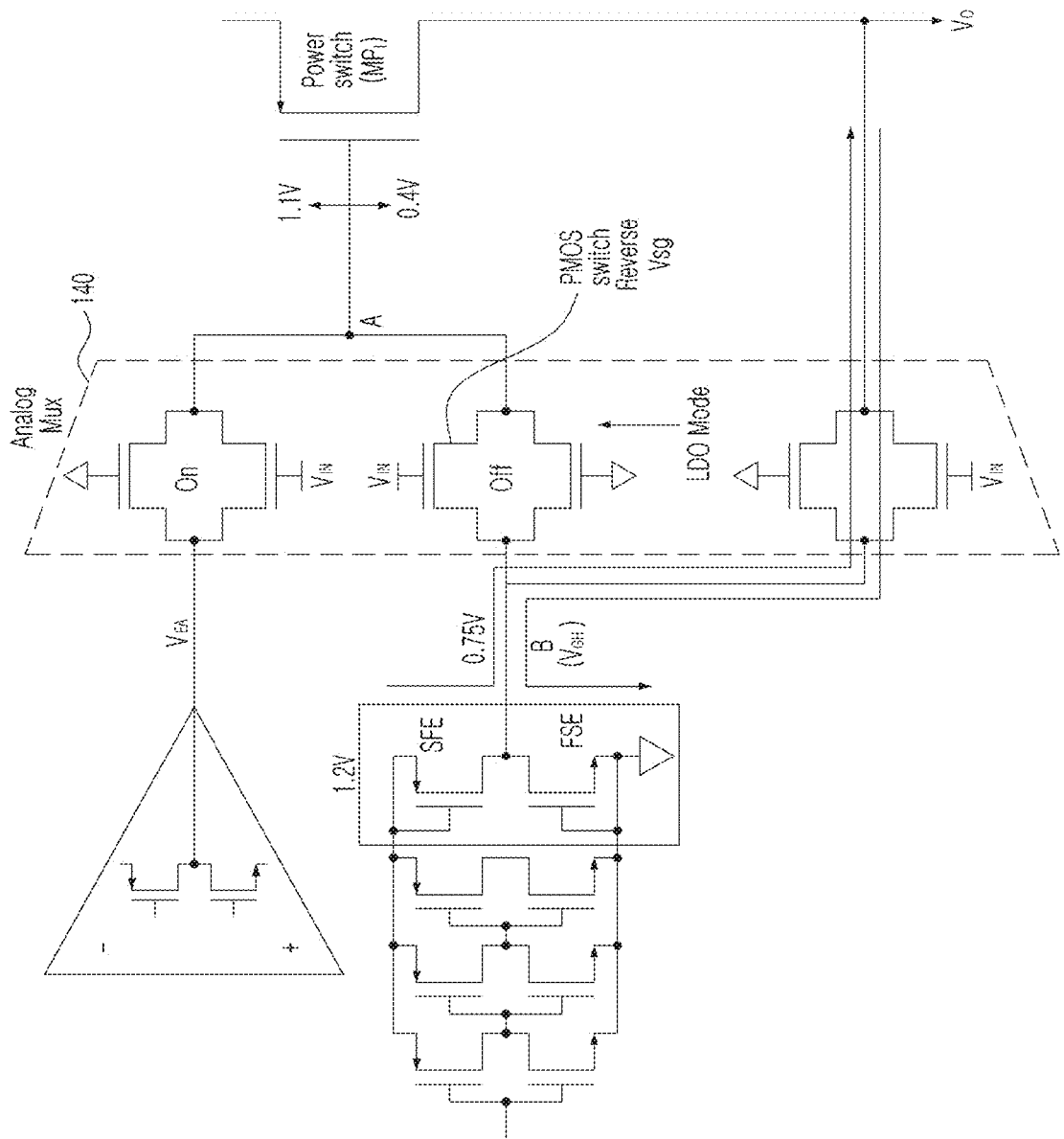
FIG. 6 is a view illustrating a reduction in leakage current of a multiplexer 140 in a power management chip 100 according to an embodiment.

FIG. 6 is a view illustrating a reduction in leakage current of a multiplexer 140 in a power management chip 100 according to an embodiment.

Referring to FIG. 6, a connection state between an output $V_{GH}$ of a gate driver 110 and an input of a multiplexer 140 in an LDO mode is illustrated. To reduce a leakage current of the multiplexer 140, a PMOS/NMOS transistor of the last stage of the gate driver 110 may be switch-connected to be turned off. The multiplexer 140 may include a switch in which drain terminals B and $V_{GH}$ of the PMOS/NMOS transistor of the last stage are connected to an output voltage $V_O$. When operating in the LDO mode, a voltage $V_{SG}$ of the switch between the drain terminal B and a gate terminal A having the gate voltage of the power switch $MP_1$ may be reversed. Therefore, the leakage current of the multiplexer 140 may be reduced.

In this case, although a leakage current may also flow in the PMOS/NMOS transistor of the last stage of the gate driver 110, the leakage current may be sunk or sourced through the output voltage $V_O$. As this does not affect the operation, deterioration in precision of the output voltage $V_O$ in the LDO mode may be prevented.

A power management chip 100 according to an embodiment may operate in an inductor sensing mode through an inductor detect signal $V_{CON}$ of an inductor detection logic 120, to detect the presence or absence of an external inductor.

Figure 7:
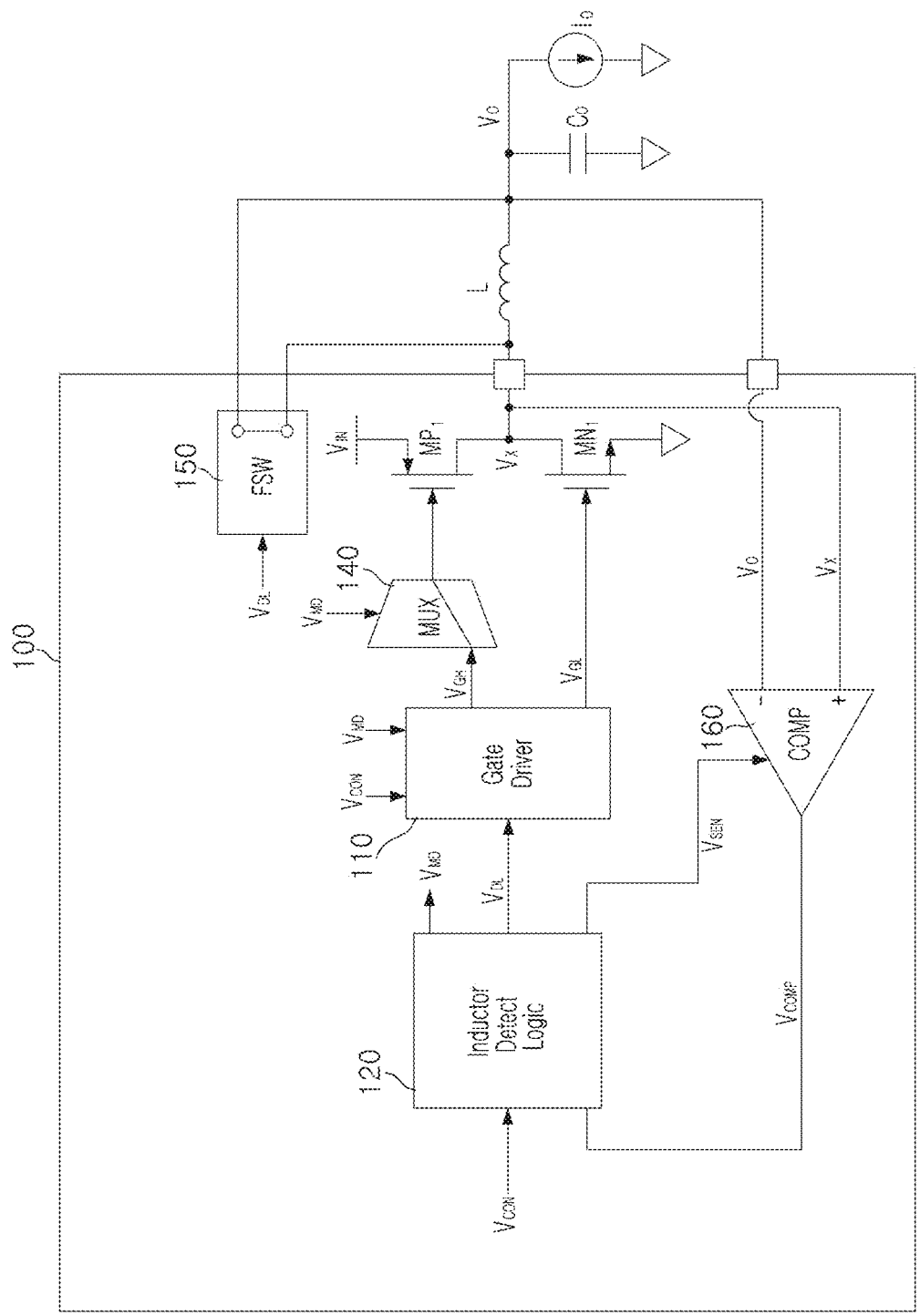
FIG. 7 is a view illustrating an inductor monitoring mode of a power management chip according to an embodiment.

FIG. 7 is a view illustrating an inductor monitoring mode of a power management chip according to an embodiment.

Referring to FIG. 7, when an inductor L is present, a power management chip 100 operates in an inductor sensing mode, as follows. In the inductor sensing mode, an inductor detect signal $V_{CON}$ may be applied at a high level, and a mode select signal $V_{MD}$ may be applied at a low level. In this case, a gate driver 110 may receive an output $V_{DL}$ of an inductor detection logic 120 as a first input of a multiplexer 140. A second input of the multiplexer 140 may be connected to a ground terminal GND. It could be $V_{GH}=V_{DL}$ and $V_{GL}=GND$.

Figure 8:
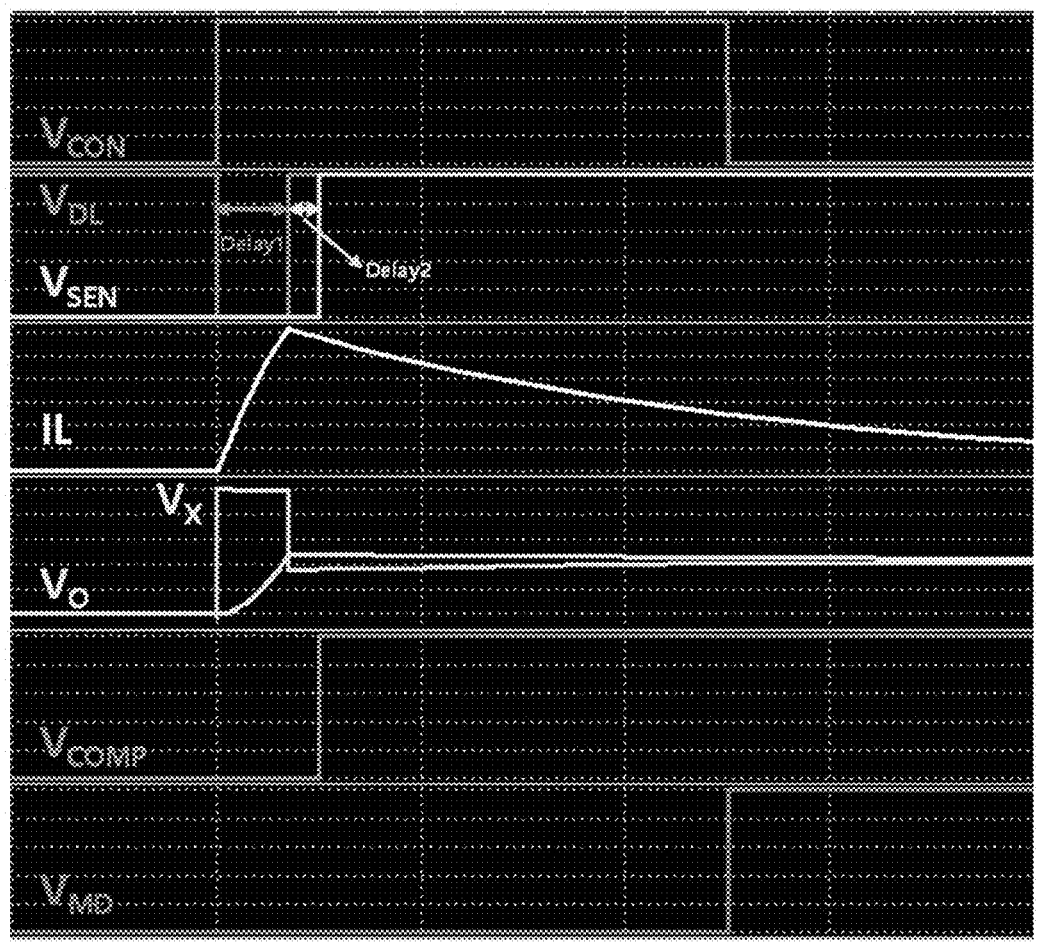
FIG. 8 is a view illustrating an operation of detecting the presence or absence of an inductor in a power management chip according to an embodiment.

FIG. 8 is a view illustrating an operation of detecting the presence or absence of an inductor in a power management chip according to an embodiment.

As illustrated in FIG. 8, when an inductor detect signal $V_{CON}$ is applied to have a high level for an inductor sensing mode, an inductor detection logic 120 may output a pulse signal $V_{DL}$ corresponding to a first delay time Delay1 and, while the pulse signal $V_{DL}$ is in a low-level state, an FSW 150 may be in an open state. When a power switch $MP_1$ is turned on, an inductor current IL may increase. An output node voltage $V_X$ may be equal to a power voltage $V_{IN}$.

When the pulse signal $V_{DL}$ transitions to a high level, the FSW 150 may be short-circuited. When the FSW 150 is short-circuited, the inductor current IL may flow through the FSW 150, and a voltage of the internal output voltage $V_X$ may be lower than an output voltage $V_O$ by Ron*IL of the FSW 150, where Ron is an on-resistance value. After the pulse signal $V_{DL}$ has a high level and a second delay time Delay2 elapses, a voltage sensing signal $V_{SEN}$ may have a high level. In this case, a comparator 160 may output a comparison result signal $V_{COMP}$ having a high level by comparing the internal output voltage $V_X$ and the output voltage $V_O$. Thereafter, the inductor sensing mode may be terminated. When the inductor detect signal $V_{CON}$ is provided to have a low level, a mode selection signal $V_{MD}$ for selecting a mode of a power management chip 100 may have a high level. Therefore, the power management chip 100 may be driven in a buck mode.

Figure 9:
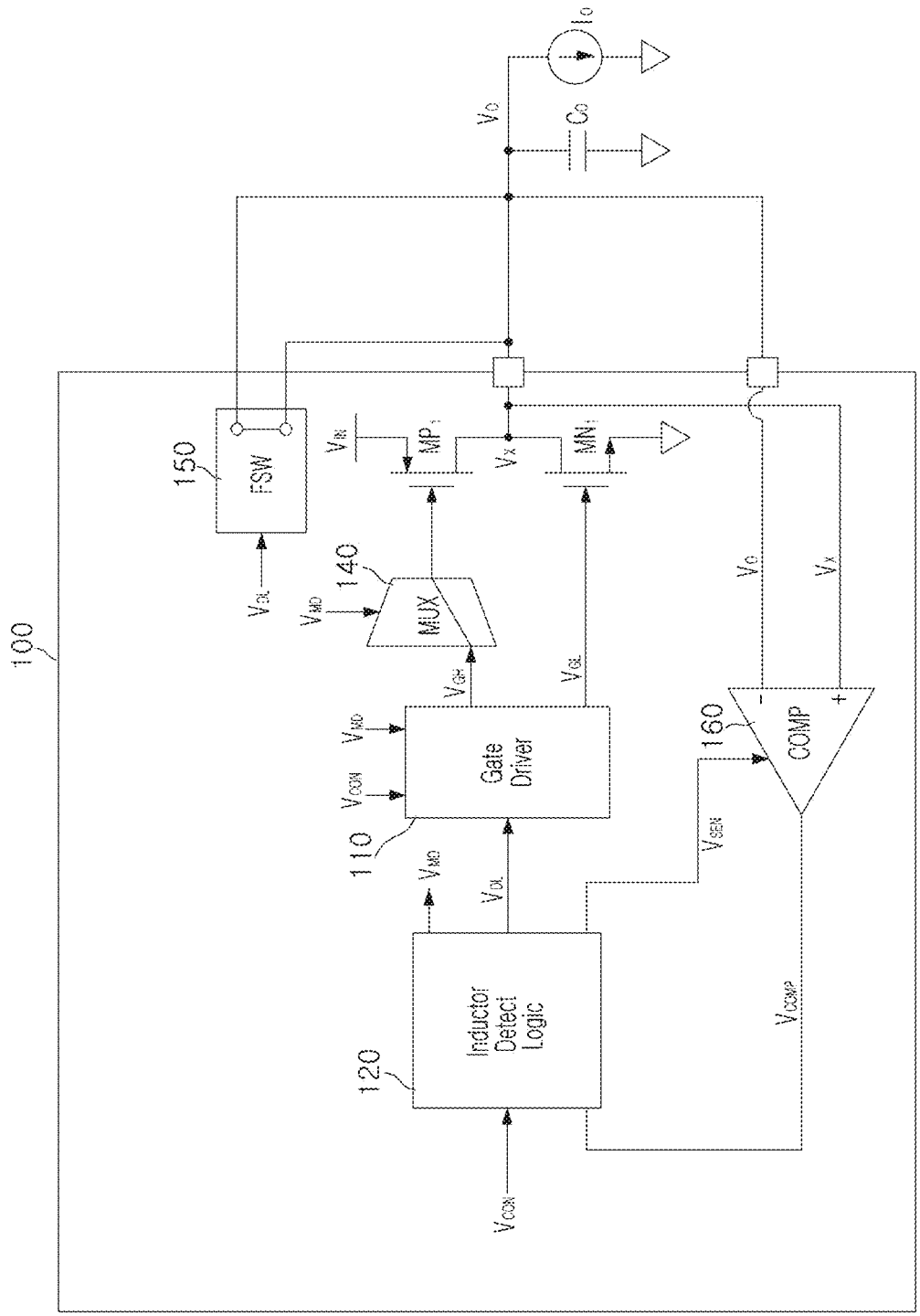
FIG. 9 is a view illustrating an inductor sensing mode when an inductor is not present in a power management chip according to an embodiment.

FIG. 9 is a view illustrating an inductor sensing mode when an inductor is not present in a power management chip according to an embodiment.

In an inductor sensing mode, an inductor detect signal $V_{CON}$ may be applied at a high level, and a mode select signal $V_{MD}$ may be applied at a low level. In this case, as illustrated in FIG. 9, a gate driver 110 may receive an output $V_{DL}$ of an inductor detection logic 120 as a first input of a multiplexer 140, and may connect a second input of the multiplexer 140 to a ground terminal GND. Thereby, $V_{GH}=V_{DL}$ and $V_{GL}=GND$.

Figure 10:
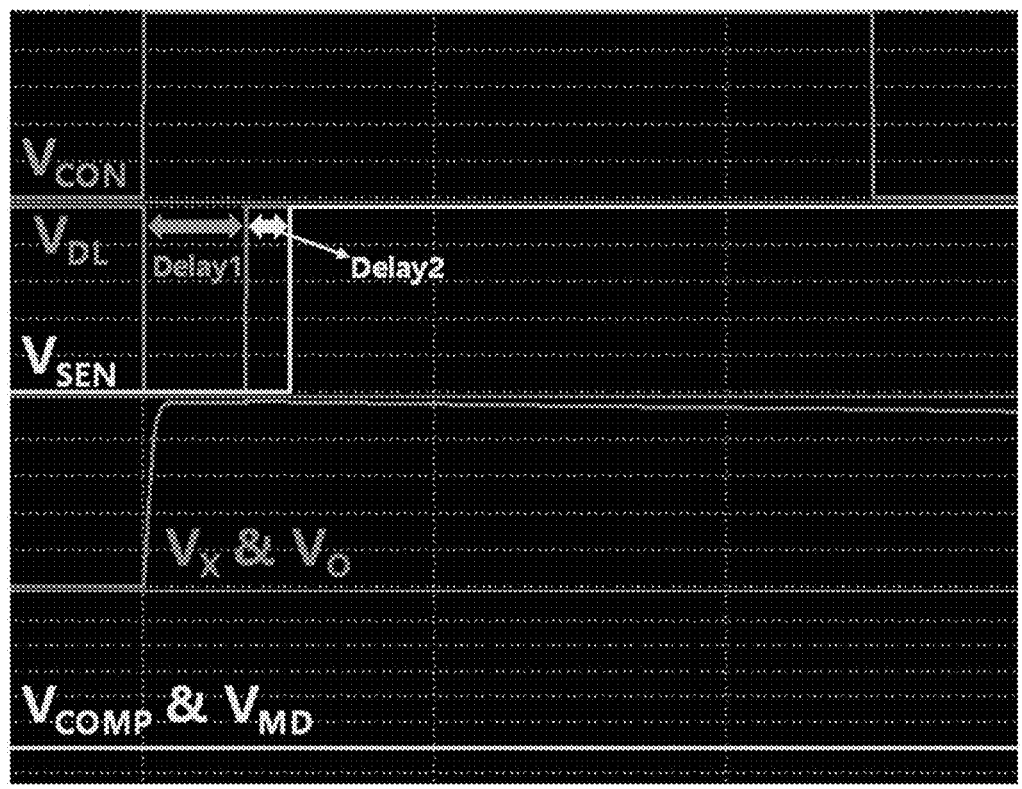
FIG. 10 is a view illustrating an operation of detecting the presence or absence of an inductor according to an embodiment.

FIG. 10 is a view illustrating an operation of detecting the presence or absence of an inductor according to an embodiment.

As illustrated in FIG. 10, when an inductor detect signal $V_{CON}$ is applied to have a high level for an inductor sensing mode, an inductor detection logic 120 may output a pulse signal $V_{DL}$ corresponding to a first delay time Delay1 and, while the pulse signal $V_{DL}$ is in a low-level state, an FSW 150 may be in an open state, and a power switch $MP_1$ may be turned on. Therefore, an internal output voltage $V_X$ and an output voltage $V_O$ may be equal to a power voltage $V_{IN}$.

Thereafter, when the pulse signal $V_{DL}$ becomes to have a high level, the FSW 150 may be short-circuited. After the pulse signal $V_{DL}$ becomes to have the high level and a second delay time Delay2 elapses, a voltage sensing signal $V_{SEN}$ may have a high level. In this case, a comparator 160 may compare the internal output voltage $V_X$ and the output voltage $V_O$. In this case, since $V_X$ and $V_O$ have the same voltage, a comparison result signal $V_{COMP}$ may be output to have a low level. Afterwards, the inductor sensing mode may be terminated. When the inductor detect signal $V_{CON}$ is provided to have a low level, a mode selection signal $V_{MD}$ for selecting a mode of a power management chip 100 may have a low level. Therefore, the power management chip 100 may be driven in an LDO mode.

Figure 11:
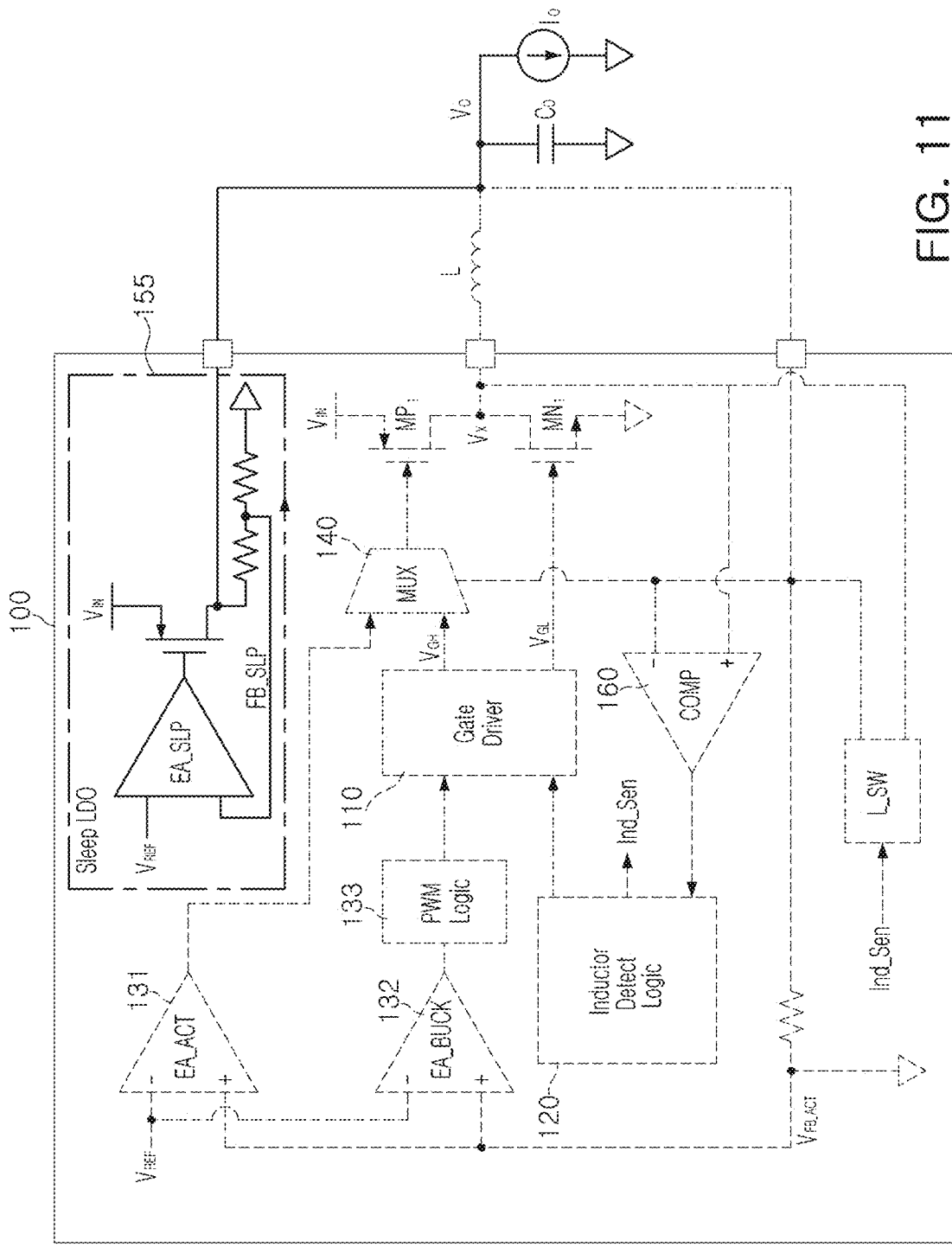
FIG. 11 is a view illustrating a start-up operation of a power management chip according to an embodiment.

FIG. 11 is a view illustrating a start-up operation of a power management chip according to an embodiment.

Referring to FIG. 11, a power management chip 100 of the present inventive concept may perform a start-up operation using a sleep LDO 155 without requiring a separate start-up circuit.

The start-up operation using the sleep LDO 155 may proceed as follows. A power-down mode that turns the circuit off entirely may be used to conserve power. In this case, for retention of an SRAM, a sleep LDO that may supply a small amount of current may be required. First, when a system enters the power-down mode, all circuits may be turned off, but the sleep LDO may operate without being turned off. In this case, an output voltage $V_O$ of the power management chip 100 may be output by $V_{REF}$ and feedback FB_SLP (e.g., a feedback signal) to perform the start-up operation.

Referring to FIG. 11, a sleep LDO regulator may include an error amplifier EA_SLP and power transistors, in a similar manner to a general LDO regulator, and a negative feedback operation structure may be implemented. When the reference voltage $V_{REF}$ is received, and the output voltage $V_O$ is output using the feedback and a resistor divider, a small amount of current may be supplied.

Figure 12:
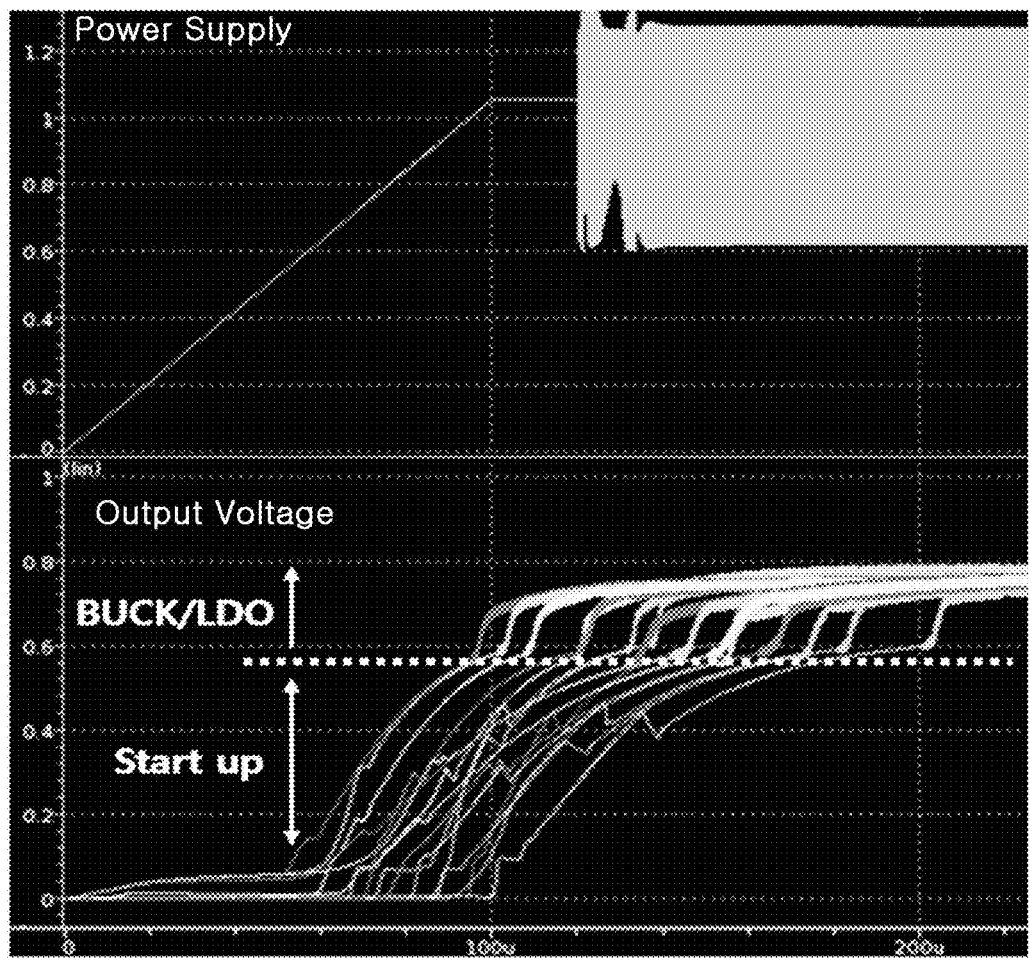
FIG. 12 is a view illustrating a start-up operation waveform using a sleep LDO in a power management chip according to an embodiment.

FIG. 12 is a view illustrating a start-up operation waveform using a sleep LDO in a power management chip according to an embodiment.

As illustrated in FIG. 12, when a power voltage $V_{IN}$ slowly rises, a start-up operation in which an output voltage $V_O$ of a sleep LDO rises above a predetermined voltage may occur. After the start-up operation has completed, a power management chip may operate in a buck/LDO mode with the help of start-up. When the output voltage $V_O$ of the power management chip rises higher than a target output voltage value of the sleep LDO, an error amplifier EA_SLP may increase the output voltage to turn off the sleep LDO. This illustrates a start-up behavior in which the sleep LDO operates during the start-up, and the sleep LDO may be adaptively turned off after completing the start-up operation.

Figure 13A:
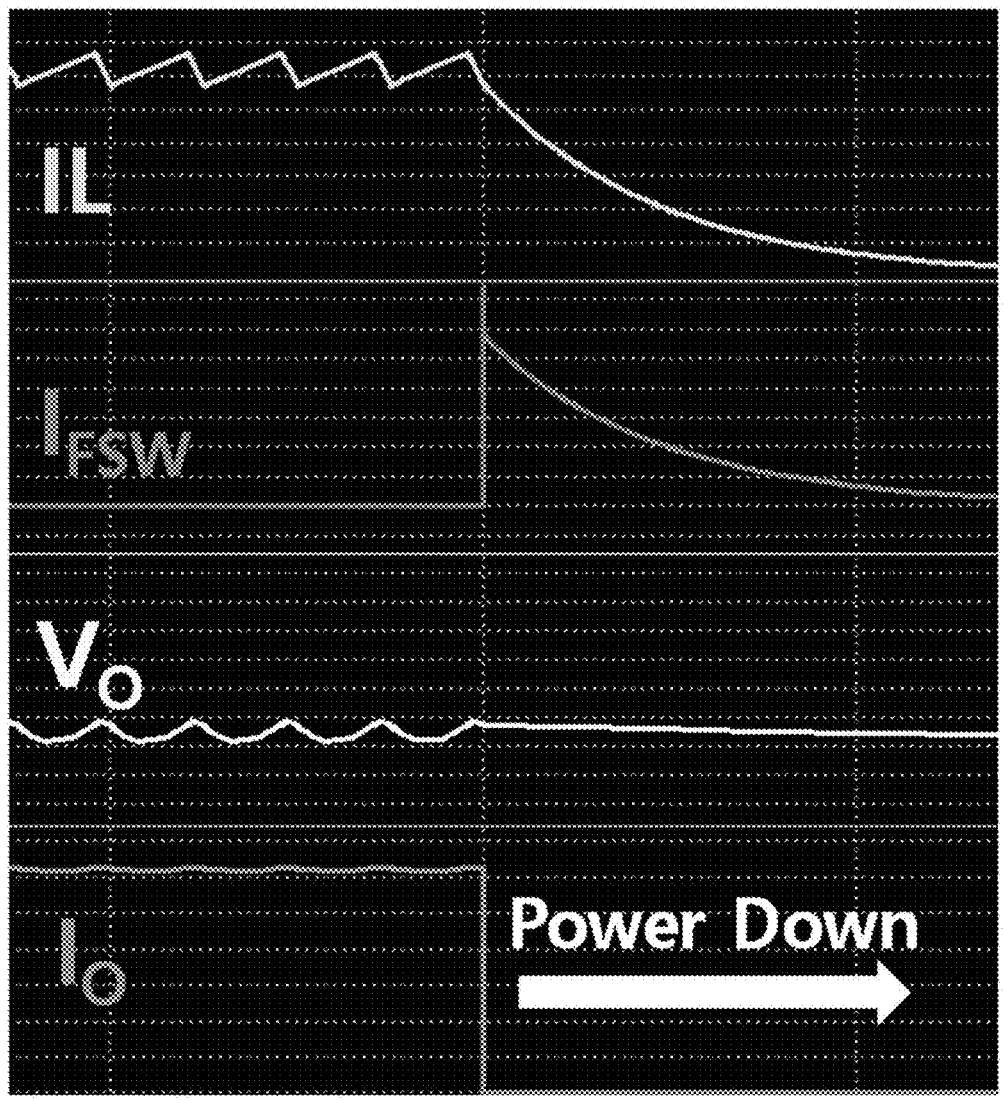
FIGS. 13A and 13B are views illustrating reducing overshoot in an embodiment.
Figure 13B:
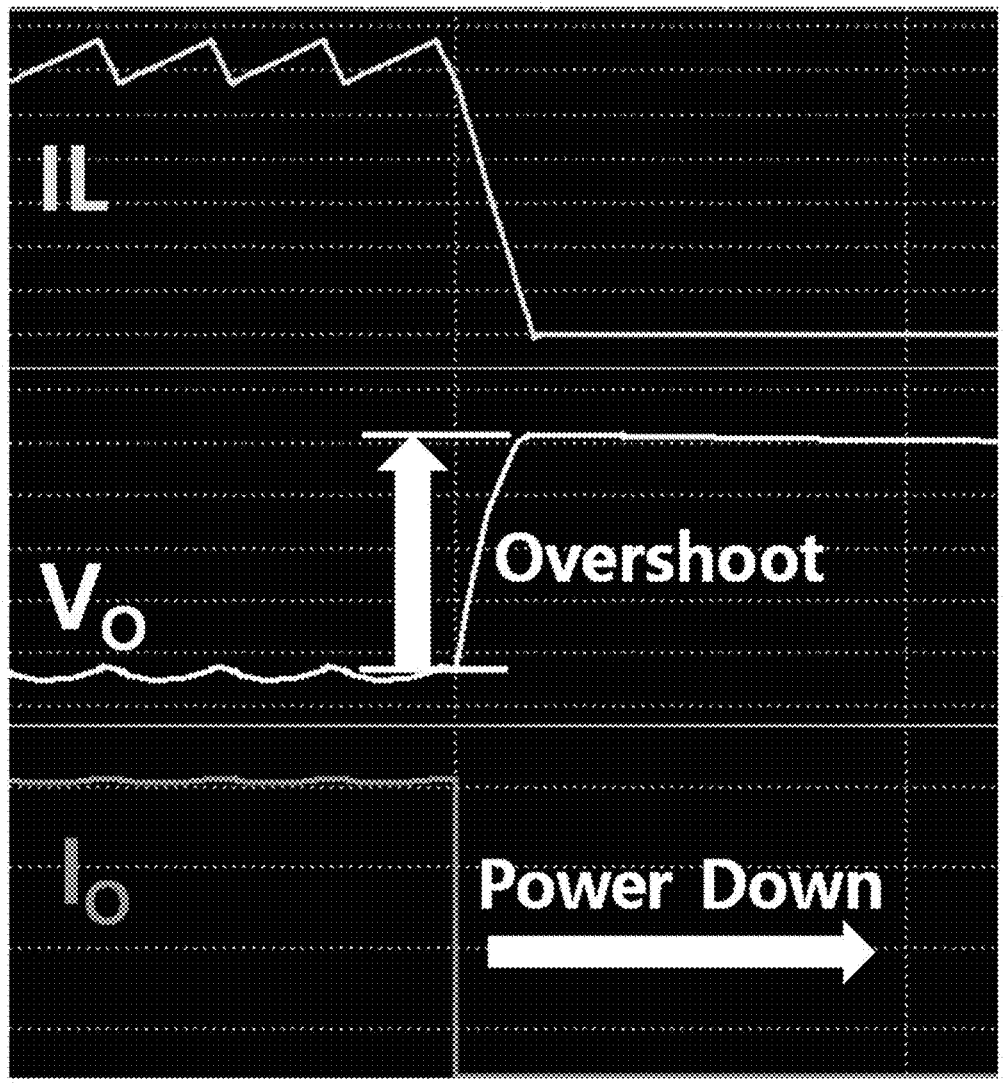

FIGS. 13A and 13B are views illustrating reduction overshoot in an embodiment.

When a PMIP operates in an active mode of a buck mode, a load current Io may be a heavy-load, and an inductor current may be built-up in several hundred milliamp (mA) to several amps (A). In this case, when the PMIP enters a power-down mode, the load current $I_O$ may be a light-load of several tens of mA or less, and a controller and power switches $MP_1$ & $MN_1$ in the buck mode may be turned off. At this moment, an overcharged current in an inductor may be discharged through an output capacitor until it reaches 0 A, as illustrated in IL of FIG. 13A. Due to the discharge of the inductor, the PMIP may output overshoot, as illustrated in $V_O$ of FIG. 13A, to affect stability of a load operation.

A PMIP of an embodiment may short-circuit the FSW 150, when transitioning from an active mode to a power-down mode. An operation at this time may be the same as those illustrated in FIG. 13B.

When an FSW 150 is short-circuited, a current IL of an overcharged inductor of FIG. 13B may be discharged through the FSW 150, as in the $I_{FSW}$ of FIG. 13B. In this case, overshoot may not exist as in $V_O$ of FIG. 13B by preventing a situation in which an output capacitor is charged.

Figure 14:
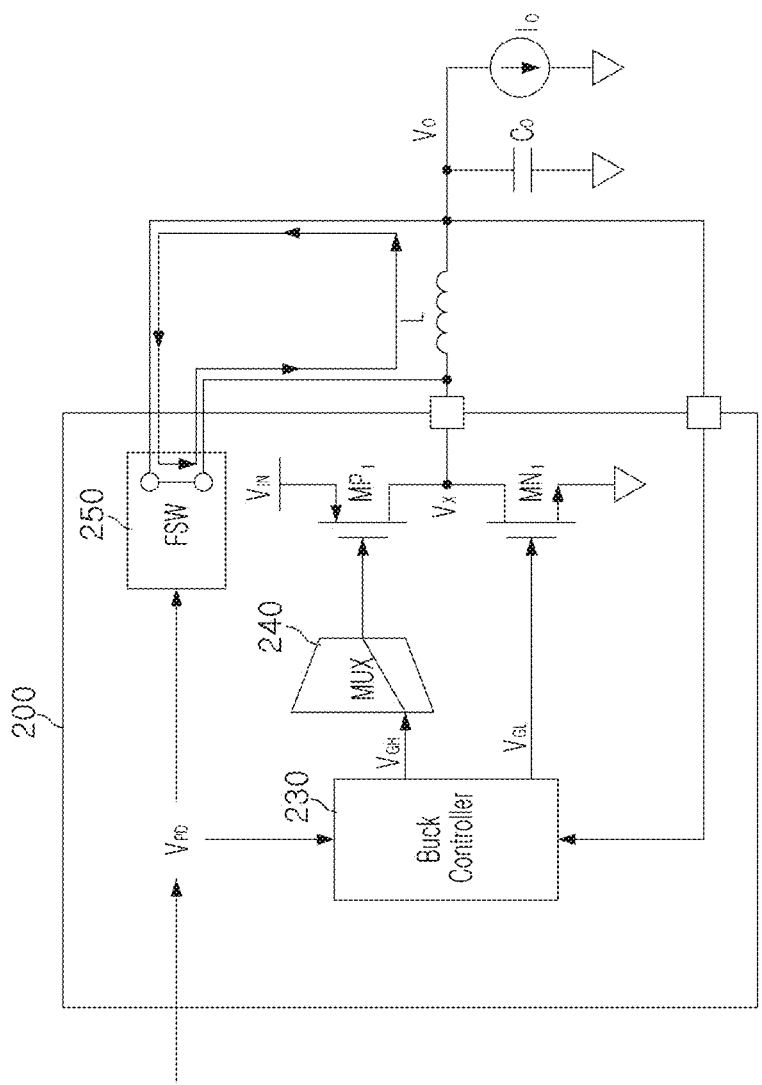
FIG. 14 is a view illustrating a process of shorting an FSW switch 250 when transitioning from an active mode to a power-down mode in a power management chip 200 according to an embodiment.

FIG. 14 is a view illustrating a process of shorting an FSW switch 250 when transitioning from an active mode to a power-down mode in a power management chip 200 according to an embodiment.

Referring to FIG. 14, a power management chip 200 may include a buck controller 230 (e.g., a control circuit), a multiplexer 240, and a flow switch 250. The power management chip 200 may short-circuit the flow switch 250, when transitioning from an active mode to a power-down mode. When the flow switch 250 is short-circuited, an overcharged current IL of an inductor L may be discharged through the flow switch 250, like $I_{FSW}$. The buck controller 230 and the FSW switch 250 may a voltage $V_{PD}$.

Figure 15:
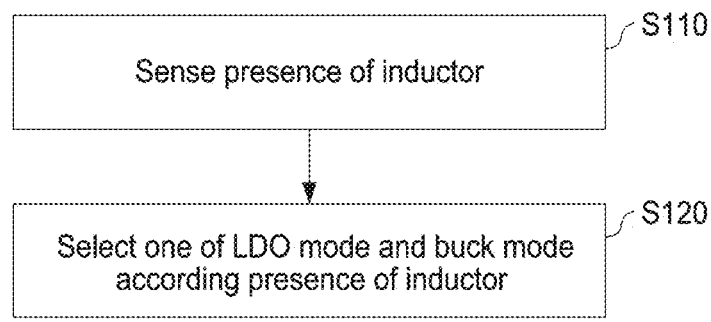
FIG. 15 is a view illustrating a method of operating a power management chip according to an embodiment.

FIG. 15 is a view illustrating a method of operating a power management chip according to an embodiment. Referring to FIG. 15, a power management chip may operate as follows. An inductor detection logic of the power management chip detects presence or absence of an inductor (S110). The power management chip selects one of an LDO mode or a buck mode according to the presence or absence of the inductor (S120).

In an embodiment, when the inductor is not present, an error amplification signal may be output by comparing a reference voltage and a voltage of a feedback node in response to a mode select signal, a multiplexer may select the error amplification signal from a first gate signal and the error amplification signal in response to the mode select signal, and a first power switch may be driven according to the error amplification signal.

In an embodiment, when the inductor is present, an error amplification signal may be output by comparing a reference voltage and a voltage of the feedback node in response to an inverted mode select signal, a pulse width modulation logic may output a drive signal corresponding to the error amplification signal, a gate driver may output a second gate signal and a first gate signal corresponding to the drive signal in response to the mode select signal, the multiplexer may select the first gate signal from the first gate signal and the error amplification signal in response to the mode select signal, and the first power switch may be driven according to the first gate signal.

In an embodiment, a second power switch may be driven in response to a second gate signal. In an embodiment, when the inductor is present, the multiplexer may be connected to the feedback node to reduce leakage current.

Figure 16:
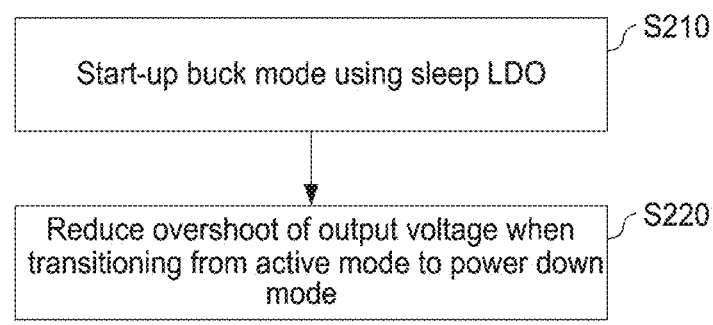
FIG. 16 is a flowchart illustrating an embodiment of a method of operating a power management chip according to an embodiment.

FIG. 16 is a flowchart illustrating an embodiment of a method of operating a power management chip according to another embodiment. Referring to FIG. 16, a power management chip may operate as follows.

The power management chip may start-up a buck mode using a sleep LDO (S210). The power management chip may reduce overshoot of an output voltage, when transitioning from an active mode to a power-down mode (S220).

In an embodiment, the sleep LDO is turned off, after the start-up has completed. In an embodiment, a presence or an absence of an inductor may be detected before starting up the buck mode. In an embodiment, the power management chip may include a multiplexer for driving a power switch according to a mode selected from an LDO mode and a buck mode, and when the inductor is not present, the multiplexer may be connected to a feedback node. In an embodiment, to reduce power consumption, components corresponding to a mode, not selected from the LDO mode and the buck mode, may be turned off.

Figure 17:
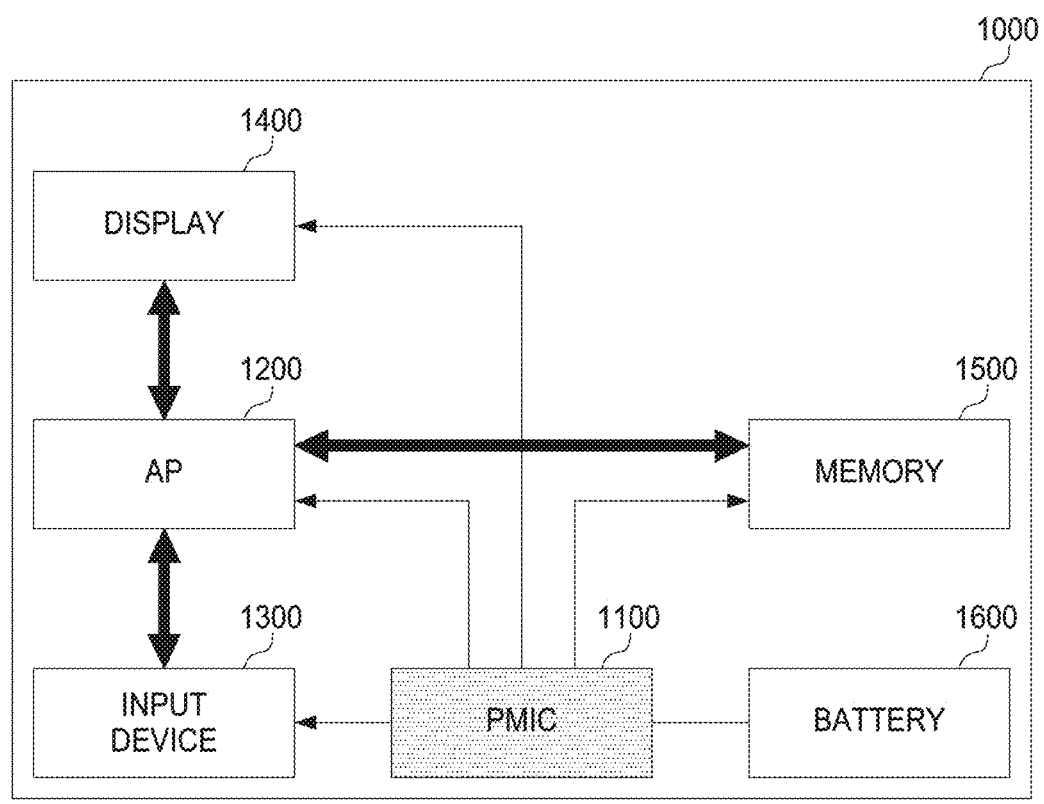
FIG. 17 is a view illustrating an electronic device 1000 according to an embodiment.

FIG. 17 is a view illustrating an electronic device 1000 according to an embodiment. Referring to FIG. 17, an electronic device 1000 may include a power management chip (e.g., a power management integrated circuit (PMIC)) 1100, an application processor (AP) 1200, an input device 1300, a display 1400, a memory 1500, and a battery 1600. For example, the PMIC 1100 may be power management chip 100 or 200. For example, the electronic device 1000 may be a device included in a vehicle, or the electronic device 1000 may be a smartphone, a personal computer (PC), a tablet PC, a netbook, an e-Reader, a personal digital assistant (PDA), a portable multimedia player (PMP), an MP3 player, an ultra-mobile PC (UMPC), a workstation, a portable computer, a web tablet, a tablet computer, a wireless phone, a mobile phone, a smartphone, an e-book, a portable game machine, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage constituting a data center, a device capable of sending and receiving information in a wireless environment, one of various electronic devices constituting a home network, one of various electronic devices constituting a computer network, one of various electronic devices constituting a telematics network, a radio frequency identification (RFID) device, or one of various electronic devices constituting a computing system. Also, the electronic device 1000 may be a wearable device such as an electronic bracelet, an electronic necklace, or the like.

The power management chip 1100 may receive power from the battery 1600, and may supply and manage the power to the AP 1200, the input device 1300, the display 1400, or the memory 1500. The electronic device 1000 may include at least one power management chip 1100. In an embodiment, the electronic device 1000 may supply power to the AP 1200, the input device 1300, the display 1400, or the memory 1500 using one power management chip 1100. In another embodiment, the electronic device 1000 may include a plurality of power management chips 1100 for individually supplying power to each of the AP 1200, the input device 1300, the display 1400, or the memory 1500. The power management chip 1100 may be implemented to operate in a dual mode, depending on whether an inductor is detected or not, as described with reference to FIGS. 1 to 16.

The AP 1200 may control an overall operation of the electronic device 1000. For example, the AP 1200 may display data stored in the memory 1500 through the display 1400 according to an input signal generated by the input device 1300. The input device 1300 may be implemented with a touch pad, a pointing device such as a computer mouse, a keypad, or a keyboard.

The memory 1500 may be implemented to store various pieces of data used by at least one component of the electronic device 1000, for example, input data or output data for software and related commands. The memory 1500 may include a volatile memory or a non-volatile memory. In an embodiment, the memory 1500 may store information on task performance conditions corresponding to various tasks. For example, the electronic device 1000 may store a task execution condition corresponding to each user identification information. The memory 1500 may store load control information for various operations of the electronic device 1000.

The battery 1600 may be implemented as a rechargeable secondary battery. For example, the battery 1600 may be charged using power received through an interface circuit or power received through a wireless charging module.

The interface circuit may be connected to an external power source by wire and may transmit power from the external power source to the power management chip 1100. The interface circuit may be implemented with a connector for connecting a cable for providing power, or may be implemented with a cable for providing power and a connector for connecting the cable to an external power source. For example, the interface circuit may be implemented with various universal serial bus (USB) type connectors. It should be understood that there is no limit to a type of the connector. When receiving DC power from the external power source, the interface circuit may transmit the received DC power to the power management chip 1100, or may transmit the received DC power to the power management chip 1100 by converting a magnitude of a voltage thereof. When receiving AC power from the external power source, the interface circuit may transmit the received AC power to the power management chip 1100 by converting the received AC power to DC power or converting a magnitude of a voltage thereof.

The wireless charging module may be implemented in a manner defined by a wireless power consortium (WPC) standard (or a Qi standard) or in a manner defined by the alliance for wireless power (A4WP) standard (or the air fuel alliance (AFA) standard). The wireless charging module may include a coil in which induced electromotive force may be generated by a magnetic field of which a size changes according to time formed therearound. The wireless charging module may include at least one of receiving coils, at least one capacitor, an impedance matching circuit, a rectifier, a DC-DC converter, or a communication circuit. The communication circuit may be implemented as an in-band communication circuit of an on/off keying modulation/demodulation method, or may be implemented as an out-of-band communication circuit (e.g., a BLE communication module). According to various embodiments, the wireless charging module may receive a beam-formed radio frequency (RF) wave based on an RF method.

In an embodiment, the interface circuit or the wireless charging module may be connected to a charger. The battery 1600 may be charged using power adjusted by the charger. The charger or a converter may be implemented as an element independent from the power management chip 1100, or may be implemented as at least a portion of the power management chip 1100. The battery 1600 may transmit stored power to the power management chip 1100. Power through the interface circuit or power through the wireless charging module may be transmitted to the battery 1600 or may be transmitted to the power management chip 1100.

Figure 18:
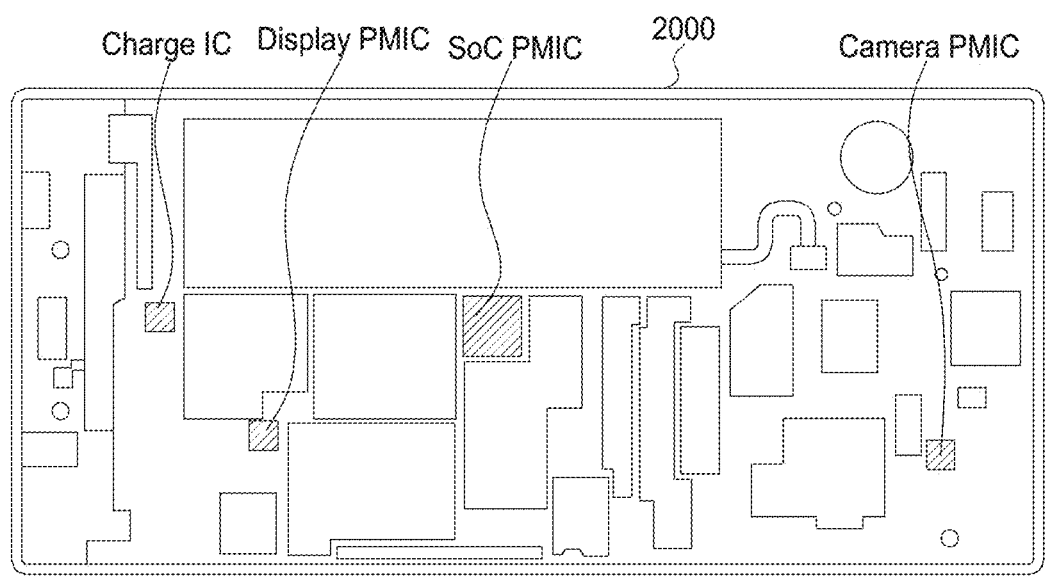
FIG. 18 is a view illustrating a mobile device 2000 to which a power management chip according to an embodiment is applied.

FIG. 18 is a view illustrating a mobile device 2000 to which a power management chip according to an embodiment is applied. Referring to FIG. 18, a mobile device 2000 may include a charge IC, a display PMIC, a SoC PMIC, and a camera PMIC. At least one of the charge IC, the display PMIC, the SoC PMIC, or the camera PMIC may be implemented as a dual-mode PMIC, as described with reference to FIGS. 1 to 16.

A power management chip according to an embodiment may be applicable to a vehicle.

Figure 19:
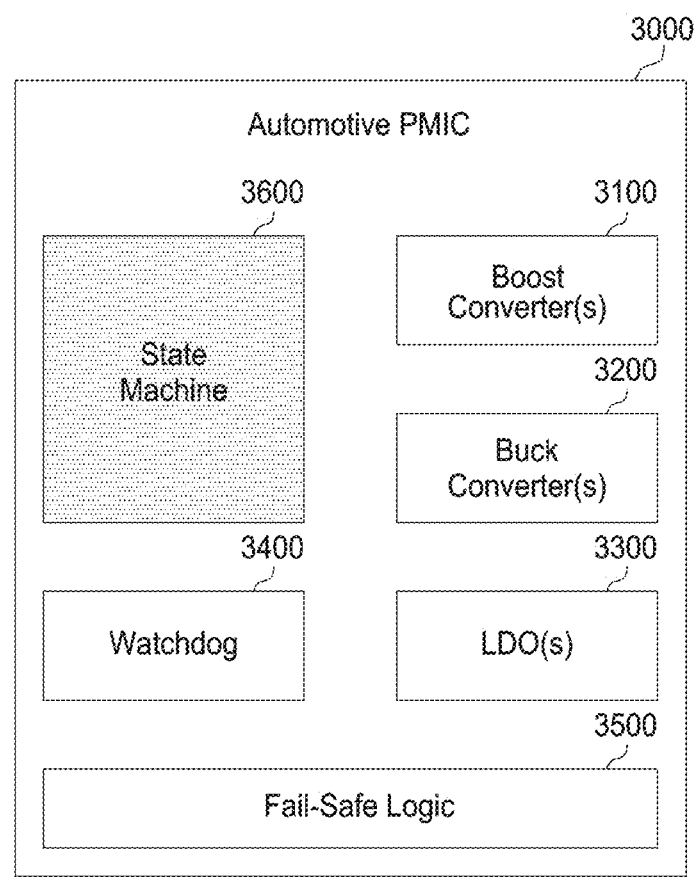
FIG. 19 is a block diagram illustrating an automotive power management chip 3000 according to an embodiment.

FIG. 19 is a block diagram illustrating an automotive power management chip 3000 according to an embodiment. Referring to FIG. 19, an automotive power management chip 3000 may include at least one boost converter 3100, at least one buck converter 3200, at least one LDO 3300, a watchdog 3400, a fail-safe logic 3500, and a state machine 3600. The state machine 3600 may be implemented to monitor an output voltage of the at least one boost converter 3100, an output voltage of the at least one buck converter 3200, and an output voltage of the at least one LDO 3300, and to change an operation mode according to monitored results thereof. In addition, the state machine 3600 may be implemented to detect the presence or absence of an inductor, as described with reference to FIGS. 1 to 16, and to change an operation mode according to detected results thereof.

The watchdog 3400 may be implemented to monitor a monitoring target circuit to generate monitored results and to generate a watchdog signal based on the monitored results. In this case, the monitoring target circuit may be at least one of the fail-safe logics 3500, the boost converter 3100, the buck converter 3200, or the LDO 3300.

The fail-safe logic 3500 may be implemented to sense occurrence of an error inside or outside the automotive power management chip 3000, and to enter a fail-safe mode, when the sensed error is determined as critically threatening safety. For example, the fail-safe logic 3500 may turn off the at least one boost converter 3100, the at least one buck converter 3200, and the at least one LDO 3300 in response to the watchdog signal.

The state machine 3600 may be implemented to determine a degree of risk of an error generated in the automotive power management chip 3000, based on at least one notification signal. For example, the state machine 3600 may generate control signals according to the degree of risk of the generated error and an automotive safety integrity level (ASIL) of an operating circuit. In this case, the operating circuit may provide a service related to autonomous driving to a user or a driver. The ASIL may be a vehicle safety integrity level, and a value thereof may be determined based on hazard analysis and risk assessment (HARA). The HARA may be a factor for evaluating a degree of risk to the driver, when the operating circuit malfunctions.

Power management intellectual property (PMIP) according to an embodiment may support a buck mode and an LDO mode using an inductor detection circuit, to support various product environments, compared to existing PMIP that support only the buck mode or only the LDO mode. A PMIP of an embodiment may improve accuracy of an LDO mode output voltage by reducing leakage occurring in an analog MUX in a structure sharing a power switch. In an embodiment, a PMIP of an embodiment may secure stability of load, using a change from an active mode to a power-down mode using an inductor both end switch. A PMIP of an embodiment may support stable start-up of a dual mode PMIP using start-up through a sleep LDO.

A power management chip of an embodiment may sense the presence or absence of an external inductor with a new structure. A power management chip of an embodiment may support an appropriate PMIP type through the presence or absence of the inductor, rather than a level of a load current. A power management chip of an embodiment may increase accuracy of an LDO mode voltage by applying an analog MUX structure with low leakage. A power management chip of an embodiment may support start-up of a dual mode PMIP using the sleep LDO. A power management chip of an embodiment may reduce overshoot of an output when transitioning from the active mode to the power-down mode using the inductor both end switch.

A power management chip, an electronic device having the same, and a method of operating the same, according to an embodiment, may perform a buck mode start-up using a sleep LDO, to perform a soft start-up without a complicated start-up circuit.

A power management chip, an electronic device having the same, and a method of operating the same, according to an embodiment, may increase output voltage accuracy according to leakage current of a multiplexer in an LDO mode.

A power management chip, an electronic device having the same, and a method of operating the same, according to an embodiment, may reduce overshoot when transitioning from an active mode to a power-down mode in a buck mode.

While example embodiments have been illustrated and described above, it will be apparent to those skilled in the art that modifications and variations could be made without departing from the scope of the present inventive concept as defined by the appended claims.

What is claimed is:

1. A power management chip comprising:
a first power switch connected between a power terminal and an output node;
a second power switch connected between the output node and a ground terminal;
a first error amplifier configured to compare a feedback node and a reference voltage when a mode select signal is a first logic level;
a second error amplifier configured to compare the feedback node and the reference voltage when the mode select signal is a second logic level different from the first logic level;
a pulse width modulation logic configured to receive an output of the second error amplifier to output a drive signal;
a gate driver configured to receive an inductor detect signal and the mode select signal, receive the drive signal from the pulse width modulation logic, and to output a first gate signal driving a first power switch and a second gate signal driving a second power switch;
a multiplexer configured to receive an error detect signal from the first error amplifier and the first gate signal from the gate driver, and to drive the first power switch with one of the error detect signal and the first gate signal in response to the mode select signal;
an inductor detection logic configured to receive the inductor detect signal, to output a comparison detect signal and a pulse signal for determining whether an external inductor is present, and to output the mode select signal corresponding to a result of the determining; and
a comparator configured to compare an internal output voltage of the output node and an output voltage of the feedback node in response to the comparison detect signal.

2. The power management chip of claim 1, further comprising a flow switch configured to receive the pulse signal and connected between the output node and the feedback node.

3. The power management chip of claim 1, further comprising a feedback network circuit connected to the feedback node and configured to output a voltage of the feedback node to the first error amplifier and the second error amplifier.

4. The power management chip of claim 1, wherein the gate driver comprises:
at least one switch configured to float an output according to the mode select signal; and
two multiplexers configured to receive the drive signal and the pulse signal for an inductor presence detection mode and an inductor absence detection mode.

5. The power management chip of claim 1, wherein the inductor detection logic outputs the pulse signal for driving an inductor both end switch externally, and outputs the mode select signal in response to an output of the comparator.

6. The power management chip of claim 1, wherein the multiplexer is connected to the feedback node to reduce a leakage current, when operating in a low drop out (LDO) mode.

7. The power management chip of claim 1, further comprising a sleep LDO for soft start-up, when driving in a buck mode, and connected to the feedback node.

8. The power management chip of claim 7, wherein the sleep LDO is configured to perform a start-up operation in which an output voltage of the sleep LDO rises to be equal to or higher than a predetermined voltage, when a power voltage rises.

9. The power management chip of claim 1, wherein, when the mode select signal indicates a buck mode, and transitions from an active mode to a power-down mode, an inductor both end switch is short-circuited.

10. The power management chip of claim 1, wherein the mode select signal indicates one of a low drop out (LDO) mode or a buck mode.

11. A method of operating a power management chip for supporting multimode operations, comprising:
detecting a presence of an external inductor; and
selecting one of a low drop out (LDO) mode or a buck mode based on a result of the detecting,
wherein the detecting the presence of the external inductor comprises:
operating a flow switch to short a circuit between an output node and a feedback node in response to a pulse signal; and
comparing an internal output voltage of the output node and an output voltage of the feedback node.

12. The method of claim 11, further comprising:
outputting an error amplification signal by comparing a reference voltage and a voltage of the feedback node in response to a mode select signal, when the external inductor is not present;
selecting the error amplification signal from a first gate signal and the error amplification signal in response to the mode select signal in a multiplexer; and
driving a first power switch according to the error amplification signal.

13. The method of claim 11, further comprising:
outputting an error amplification signal by comparing a reference voltage and a voltage of the feedback node in response to an inverted mode select signal, when the external inductor is present;
outputting a drive signal corresponding to the error amplification signal in a pulse width modulation logic;
outputting a first gate signal and a second gate signal corresponding to the drive signal in response to the inverted mode select signal in a gate driver;
selecting the first gate signal from the first gate signal and the error amplification signal in response to the inverted mode select signal in a multiplexer; and
driving a first power switch according to the first gate signal.

14. The method of claim 13, further comprising driving a second power switch in response to the second gate signal.

15. The method of claim 11, further comprising connecting a multiplexer to the feedback node to reduce a leakage current, when the external inductor is present.

16. A method of operating a power management chip for determining one of a low drop out (LDO) mode and a buck mode depending on whether an inductor is detected, comprising:
starting up the buck mode using a sleep LDO; and
reducing overshoot of an output voltage by operating a flow switch to short a circuit between an output node and a feedback node, when transitioning from an active mode to a power-down mode.

17. The method of claim 16, further comprising turning off the sleep LDO after the starting up has completed.

18. The method of claim 16, further comprising detecting a presence or absence of the inductor.

19. The method of claim 18, wherein the power management chip comprises a multiplexer for driving a power switch according to a mode selected from the LDO mode and the buck mode, and
the method further comprises connecting the multiplexer to the feedback node, when the inductor is not present.

20. The method of claim 16, further comprising turning off components corresponding to a mode not selected from the LDO mode and the buck mode.

21. A method of operating a power management chip for supporting multimode operations, comprising:
detecting a presence of an external inductor; and
selecting one of a low drop out (LDO) mode or a buck mode based on a result of the detecting,
wherein the detecting the presence of the external inductor comprises:
receiving an inductor detect signal;
outputting a comparison detect signal and a pulse signal for determining whether the external inductor is present;
outputting a mode select signal corresponding to a result of the determining; and
comparing an internal output voltage of an output node and an output voltage of a feedback node in response to the comparison detect signal.

* * * * *